Patented Aug. 21, 1951

2,565,098

UNITED STATES PATENT OFFICE 2,565,098

MILK FOOD PRODUCT

Paul F. Sharp, Piedmont, and Wesley H. Hoecker, Orinda, Calif., assignors to Golden State Company, Ltd., San Francisco, Calif., a corporation of Delaware No Drawing. Application January 15, 1947, Serial No. 722,284

17 Claims. (Cl. 99—55)

This invention relates to milk food products having a high lactose content and a method of preparing the same. It relates particularly to the preparation of food products from all or at least a portion of the solids normally found in skim milk, milk, or milk and cream.

More particularly, it relates to products of the character described, and the method of preparing the same, which products have a lactose content far in excess of that which it has heretofore been considered possible to have, and still retain the desired smoothness and good flavor. It also relates, more particularly, to products of the character described, the preparation of which includes the growth of cheese ripening organisms in milk solids concentrates having a lactose content that would normally inhibit the growth of such organisms, and the method of preparing such concentrates.

The present invention comprises the steps of producing milk solids concentrates, seeding these concentrates so that the supersaturation with lactose is eliminated, in that the excess lactose over saturation appears as fine and preferably impalpable crystals, and processing the concentrate to the desired product. In certain instances it may be preferred to seed before processing while in other instances the reverse order of treatment may be preferred. Accordingly, the invention is not to be limited in this respect and the broad claims are to be construed as covering either order of practice irrespective of the order in which these steps appear in the claims.

As set forth herein, milk or milk and butterfat concentrates mean products prepared, for example, by evaporating whole milk to increase the solids content, preferably in the general range of 40 to 70 per cent or higher, or by adding to a high butterfat content material concentrated milk or concentrated whey cheese as used herein is used in its commonly understood sense, whether modified with a small percentage of milk solids or not, and cheese-like spreads designate a mixture of a concentrate with various proportions of a normal cheese and other flavoring material, or with the latter alone. All of these products, it is of course understood, contain a percentage of lactose far in excess of that normally found in like products currently on the market.

The standard method of manufacturing cheese under present practice is to coagulate the milk by suitable means, such as by adding rennet. The whey, consisting mainly of the water soluble lactose, minerals, and uncoagulated proteins, is separated from the curd and the latter treated in a manner dependent upon the product desired. Normally, only a very small percentage of the lactose present in the milk is retained in the curd, and, after ripening, lactose is practically never present in a hard cheese such as cheddar.

Attempts have been made to form a suitable cheese base containing a high percentage of the milk sugar, by removing 80 percent or more of the water from milk, leaving about 40 percent solids content or more in the case of whole milk and about 33 percent solids content in the case of skim milk. However, a product results which is highly resistant to bacterial growth and which later develops such a sandy texture that it is considered unfit for human food.

A greater lactose content is obtained in the preparation of modified cheese or spreads under present practice through the addition of milk solids not fat. These products are of two types. The first product is made by processing a cheese such as cheddar with heat and salts, often with the addition of skim milk or whey solids together with cream or water. The cream or moisture content imparts the spreading property. In this type of product, the whey solids are limited to a maximum of 10% corresponding to about 7% of lactose in the finished product. Otherwise relatively large lactose crystals, and consequent sandiness, develop through slow crystallization during the holding period.

A second type product is the cream cheese and cream cheese base spreads. This type cheese is normally prepared today from a milk having a butterfat content of about 6% or higher. It may contain gelatine and is usually coagulated or curdled by lactic acid producing organisms. The whey containing most of the lactose is separated from the curd. This curd base, in addition to being mixed with varying proportions of ripened cheese, may be extended or modified by the addition of a limited amount of condensed or powdered skim milk or whey, care being taken to avoid introduction of an access of milk sugar or lactose in the finished product. Maximum tolerance of whey solids here also is about 9–10% corresponding to roughly 7% lactose content.

It is a primary object of the present invention to provide products containing most or all of the lactose present in the original milk.

It is another object of the present invention to provide cheese products containing lactose in amounts equal to or in excess of that which heretofore caused graininess, and yet which have a smooth texture.

It is another object to provide cheese-like products containing markedly higher percentages of lactose than have been attained heretofore in such products.

It is another object to provide cheese and cheese-like spreads having a high lactose content, which content does not materially inhibit growth of souring and ripening organisms.

It is another object to produce a concentrated milk product of extended keeping qualities over that of market milk, in that it can be successfully kept for an extended period of weeks under refrigeration, without deterioration, and which does not have the cooked flavor of evaporated milk.

Another object is to produce a concentrated milk product of extended keeping properties that may be used in cooking in place of market milk and cream.

Another object is to provide a process whereby a major part, if not all, of the lactose in the original milk will be retained in cheese products made therefrom.

Another object is to provide cheese and cheese-like spreads of improved nutritional value due to their higher content of lactose and other constituents normally lost in the whey.

Further objects of the invention will appear from the following description.

The improved products may best be described by reference to the preferred method of manufacture for three representative types of products.

In the manufacture of a plastic food product from a milk solids concentrate, a non-coagulated product, the whole milk is concentrated to about 50–52% solids content. This concentrate is cooled to 70° F. at which temperature the concentrate is markedly supersaturated as to lactose. This cooled concentrate is seeded by adding powdered crystals or lactose and stirring the mix for 15 minutes whereby crystallization on the order of two hundred million crystals per cubic centimeter is produced. To the mix is added about .1% by weight of carob bean gum. The mixture is then warmed to about 110° F. and homogenized while at the plastic point of the butterfat by being pumped under a pressure of about 2000 lbs. per sq. in. through a shearing valve which breaks up and disperses the fat globules.

There is no separation of whey in this process so all the lactose is retained in the product. This lactose is present in two forms, crystals formed during seeding and as an aqueous solution. While warming dissolves some of the crystals, upon cooling this product does not develop grainy structure due to formation of any large crystals.

This particular characteristic of the plastic food product described is one of great importance in that the stability of the crystal size even under the application of heat and subsequent cooling enables the homogenization to be successfully carried out at the plastic point of butterfat without the danger of imparting graininess to the finished product.

When manufacturing a rennet-type cheese, such as blue cheese, for example, the whole milk is concentrated to about 50% solids content and seeded by pumping into the milk, when cooled to about 65° F., an amount of concentrated milk carrying powdered crystalline lactose in a finely dispersed form. It is then enriched with sufficient cream to give a proportion of about 50% butterfat on the dry basis after the subsequent loss of a small amount of whey and its dissolved solids during the making of the cheese. The mixture is warmed to about 88° F. without dissolving all of the lactose and is coagulated with a small amount of rennet. The coagulated material is cut with curd knives, mixed with mold powder and put into hoops from which a small amount of whey drains. The cheese obtained in this manner is then ripened in accordance with normal procedure.

The large lactose content of this blue cheese is held in a form which is substantially not organoleptic. Here again, as in the case of the preparation of the product described above, the warming of the mixture containing the impalpable lactose crystals followed by a cooling of the coagulated material does not result in the formation of crystals of an undesirable organoleptic size.

A cheese-like spread is prepared by mixing 1 part of a flavoring cheese, such as cheddar or blue cheese, with 2 to 4 parts by weight of a milk solids concentrate prepared as described above. A high speed agitation is a necessary step in the preparation of this product, which step may take place either before or after the addition of the flavoring cheese.

The lactose content of the finished product is reduced proportionally by the amount of regular cheese being blended but still is about 20%, an amount far in excess of solubility limits and greatly in excess of that normally in such cheeses and is a proportion never allowable heretofore without destroying the smooth texture of the product.

Another feature of importance in this improved method of cheese manufacture is the rapid growth of the cheese ripening organisms and the rapid increase of acidity in the seeded milk concentrates after inoculation.

This is well illustrated by the results of the following laboratory tests made by applicant.

Several different samples of whole milk concentrate having approximately 50% solids were cooled to 70° F. Part of the concentrate was seeded and the balance was retained unseeded. Each pair of samples were agitated for 15 minutes after the seed crystals were added to one sample of concentrate. Each pair of seeded and unseeded concentrates was inoculated with equal amounts of lactic acid culture. The cultures were maintained at about 70° F. and examined at intervals with the results as shown in the following table.

TABLE I

Pair #1

| Hours held at approx. 70° F. | 0 | 16 | 42 |
|---|---|---|---|
| Bacteria per ml.: | | | |
| Unseeded | | 490,000 | 40,000,000 |
| Seeded | | 77,000,000 | 2,900,000,000 |
| Titratable Acid, (Per Cent): | | | |
| Unseeded | 0.58 | 0.58 | 0.65 |
| Seeded | 0.58 | 0.65 | 1.40 |
| pH: | | | |
| Unseeded | 6.12 | 6.12 | 5.98 |
| Seeded | 6.12 | 6.03 | 5.60 |

TABLE II

Pair #2

| Hours held at approx. 70° F. | 0 | 12 | 36 |
|---|---|---|---|
| Bacteria per ml.: | | | |
| Unseeded | | 380,000 | 30,000,000 |
| Seeded | | 225,000 | 132,000,000 |
| Titratable Acid, (Per Cent): | | | |
| Unseeded | | 0.76 | 0.77 |
| Seeded | | 0.73 | 1.23 |
| pH: | | | |
| Unseeded | 6.20 | 6.20 | 6.20 |
| Seeded | | 6.20 | 5.89 |

The differences in bacterial growth in development of titratable acidity, and in pH indicate that during the normal period of processing, the seeded concentrates are far superior to unseeded concentrates for cheese product manufacture.

Supersaturation of the milk concentrates with respect to lactose is of course a prerequisite to their being used for production of these high lactose content products. This supersaturated condition of holding in solution more than would normally be retained if the liquid were in equilibrium with crystals may be reached by evaporating away the water until supersaturation is reached, or by cooling concentrated solutions to a point where the solubility of lactose in the aqueous solution is exceeded, or a combination of both methods, as for example, in a triple effect vacuum evaporator. The temperature, or temperatures, and the method of attaining supersaturation should preferably be such that the material is not seriously discolored or otherwise affected to the detriment of the odor or general quality of the material.

The concentration of the milk solids concentrate will vary with the particular starting materials utilized. If the starting material is whole milk, the concentration may be raised to about 50–52% solids content of which approximately 18% is lactose at which concentration the solution is supersaturated with respect to lactose at about 110° F. If the starting material is skimmed milk, the concentration may be raised to about 45 to 48% solids content of which about 25% is lactose at which concentration the solution is markedly supersaturated.

The minimum concentration is limited to that at which the solution will crystallize a fair number of millions of crystals upon seeding at reasonable temperatures. The maximum concentration is limited by the ability of the seeding method to properly seed the viscous concentrates. When preparing a cheese that is acid or rennet coagulated the milks are not usually raised to the same high solids content level as they are when making milk solids concentrates.

Seeding of the concentrates may be accomplished in several ways. Crystallization can be induced in supersaturated solutions by adding to the solution comminuted crystals of lactose, either alone or as a suspension in a concentrated milk medium, or by adding concentrated milk from a previous batch having a large number of fine crystals therein. Another seeding method involves the use of a seeding surface of lactose, and through the presence of the surface in contact with the concentrated milk being treated, inducing multiple growth of crystals which are removed from the environment of the seeding surface repeatedly so as to interrupt the growth of crystal nuclei in contact with the surface almost as rapidly as they are formed. This method is described in more detail in the copending application of Paul F. Sharp, Serial No. 686,155, filed July 25, 1946.

The temperature at which the milk concentrates are seeded has a marked effect upon the final product. In general, the lower the temperature, the greater the supersaturation and the larger quantity of lactose that appears in the crystalline form; and, consequently, the less lactose that is removed as a soluble constituent in the whey. Therefore, if the product desired is a coagulated cheese from which the whey is separated, then the temperature is kept relatively low.

When the product is a milk solids concentrate from which no whey is withdrawn, the seeding temperature still should be relatively low in order to crystallize from solution as much lactose as possible. By seeding and crystallizing nearer the storage and ripening temperatures, the milk solution will crystallize down to lower lactose concentrations. Thus, unless there is excessive loss of moisture through storage under improper conditions, there will be no tendency for crystal growth that would cause sandiness.

In general, the temperature range for optimum seeding varies from 50° F. to 90° F., depending upon the character of the milk concentrates. Temperatures below 50° F. are rarely used because of the increased viscosity of the milk concentrates at low temperatures. Temperatures for crystallization above 90° F. are also seldom used because of the increased solubility of the lactose and because of the tendency for increased crystallization as the products are cooled to storage or ripening temperatures.

The following are representative products, having increased lactose content, which may be effectively and economically produced according to the present method: Hard cheeses such as cheddar, semi-hard cheese such as blue, soft cheeses such as camembert, cream cheese and the like.

The cheeses of this invention may be mixed with addition agents at various stages of processing such as: acetic, propionic, or lactic acids and the like; ketones such as diacetyl, methyl-amyl-ketone and the like; organic coloring matter, such as carotene, cheese and butter color and the like; gums, such as carog bean, dariloid pectin and the like; and inorganic salts, such as sodium chloride.

What is claimed is:

1. A plastic food product derived from milk, containing by weight from substantially 30% to substantially 60% of water and having the balance thereof composed of milk solids, said product containing lactose in quantity of from substantially 10% to substantially 40% and in all cases containing milk solids not lactose in quantity not less than 1 part to each 2 parts of lactose present, a part of the lactose present being dissolved in the water to produce a saturated solution thereof and the remaining part of said lactose being present as crystals of such small size as to give an organoleptically smooth texture to the food product, the quantity of said lactose crystals being sufficient to give to said product a relatively thick, spreadable, plastic consistency.

2. A plastic food product derived from milk, containing by weight from substantially 30% to substantially 60% of water and having the balance thereof composed of milk solids, said product containing lactose in quantity of from substantially 10% to substantially 40% and in all cases containing milk solids not lactose in quantity not less than 1 part to each 2 parts of lactose present, a part of the lactose present being dissolved in the water to produce a saturated solution thereof and the remaining part of said lactose being present as crystals of such small size as to give an organoleptically smooth texture to the food product, the quantity of said lactose crystals being sufficient to give to said product a relatively thick, spreadable, plastic consistency, and said product being homogenized.

3. A plastic food product derived from milk as defined in claim 1, further characterized in that it contains approximately .1% of carob bean gum.

4. A cheese-like plastic food as defined in claim 1, further characterized in that it has a cheese flavor imparted thereto through the presence therein of cheese ripening organisms.

5. A cheese-like spread comprising a blend of a minor amount of regular type distinctive flavored cheese and a major amount of a plastic food product derived from milk of the character defined in claim 1.

6. A plastic food product derived from milk containing by weight substantially 50% of water and substantially 50% of milk solids, said product containing lactose in quantity in the neighborhood of substantially 20%, a part of the lactose present being dissolved in the water to produce a saturated solution thereof and the remaining part of said lactose being present as crystals of such small size as to give an organoleptically smooth texture to the food product, the quantity of said lactose crystals being sufficient to give to said product a relatively thick, spreadable, plastic consistency.

7. A plastic food product derived from milk containing by weight substantially 50% of water and substantially 50% of milk solids, said product containing lactose in quantity in the neighborhood of substantially 20%, a part of the lactose present being dissolved in the water to produce a saturated solution thereof and the remaining part of said lactose being present as crystals of such small size as to give an organoleptically smooth texture to the food product, the quantity of said lactose crystals being sufficient to give to said product a relatively thick, spreadable, plastic consistency, and said product being homogenized.

8. A plastic food product derived from milk as defined in claim 6, further characterized in that it contains approximately .1% of carob bean gum.

9. A cheese-like plastic food as defined in claim 6, further characterized in that it has a cheese flavor imparted thereto through the presence therein of cheese ripening organisms.

10. A cheese-like spread comprising a blend of a minor amount of regular type distinctive flavored cheese and a major amount of a plastic food product derived from milk of the character defined in claim 6.

11. The method of preparing a food product derived from milk, which is relatively thick and has a spreadable plastic consistency at ordinary temperatures, which comprises concentrating the milk and producing a milk solids concentrate having from substantially 40% to substantially 70% total solids, of which approximately 10% to approximately 40% is lactose and of which not less than approximately 1 part for each 2 parts of lactose present is milk solids not lactose, cooling said concentrate to a temperature of between 50° F. and 90° F. and while maintaining said concentrate at such temperature seeding the same and producing therein lactose crystals of such small size as to give an organoleptically smooth texture to the food product and in sufficient number to give to said product a relatively thick, spreadable, plastic consistency.

12. The method of preparing a food product derived from milk, which is relatively thick and has a spreadable plastic consistency at ordinary temperatures, which comprises concentrating milk and producing a milk solids concentrate having from substantially 40% to substantially 70% total solids, of which approximately 10% to approximately 40% is lactose and of which not less than approximately 1 part for each 2 parts of lactose present is milk solids not lactose, cooling said concentrate to a temperature of between 50° F. and 90° F. and while maintaining said concentrate at such temperature seeding the same and producing therein lactose crystals of such small size as to give an organoleptically smooth texture to the food product and in sufficient number to give to said product a relatively thick, spreadable, plastic consistency, and then homogenizing the seeded concentrate.

13. The method of preparing a food product derived from milk, which is relatively thick and has a spreadable plastic consistency at ordinary temperatures, which comprises concentrating milk and producing a milk solids concentrate having substantially of 50% total solids, of which approximately 10% to approximately 40% is lactose and of which not less than approximately 1 part for each 2 parts of lactose present is milk solids not lactose, cooling said concentrate to a temperature of between 50° F. and 90° F. and while maintaining said concentrate at such temperature seeding the same and producing therein lactose crystals of such small size as to give an organoleptically smooth texture to the food product and in sufficient number to give to said product a relatively thick, spreadable, plastic consistency.

14. The method of preparing a food product derived from milk, which is relatively thick and has a spreadable plastic consistency at ordinary temperatures, which comprises concentrating milk and producing a milk solids concentrate having substantially of 50% total solids, of which approximately 10% to approximately 40% is lactose and of which not less than approximately 1 part for each 2 parts of lactose present is milk solids not lactose, cooling said concentrate to a temperature of between 50° F. and 90° F. and while maintaining said concentrate at such temperature seeding the same and producing therein lactose crystals of such small size as to give an organoleptically smooth texture to the food product and in sufficient number to give to said product a relatively thick, spreadable, plastic consistency, and then homogenizing the seeded concentrate.

15. The method of preparing a food product derived from milk, which is relatively thick and has a spreadable plastic consistency at ordinary temperatures, which comprises concentrating milk and producing a milk solids concentrate having from substantially 40% to substantially 70% total solids, of which approximately 10% to approximately 40% is lactose, and of which not less than approximately 1 part for each 2 parts of lactose present is milk solids not lactose, cooling said concentrate to a temperature of between 50° F. and 90° F. and while maintaining such concentrate at such temperature seeding the same and producing therein lactose crystals in quantity of substantially two hundred million per cubic centimeter.

16. The method of preparing a plastic food product, which comprises the steps defined in claim 11, followed by the addition to the seeded concentrate of cream in quantity to give to the finished product in the neighborhood of 50% milk fat on a dry weight basis, thereafter coagulating the product and mixing the same with mold powder of selected character, draining said product, and finally ripening the same in accordance with known procedure.

17. The method of preparing a plastic food product, which comprises the steps defined in claim 11, followed by the addition to the seeded concentrate so produced of a quantity of a selected flavoring cheese, and agitating the product either before or after the addition of said selected flavoring cheese.

PAUL F. SHARP.
WESLEY H. HOECKER.

REFERENCES CITED

The following references are of record in the file of this patent:

UNITED STATES PATENTS

| Number | Name | Date |
|---|---|---|
| 515,736 | Angus | Mar. 6, 1894 |
| 1,634,410 | Eldredge | July 5, 1927 |
| 1,918,595 | Frederiksen | July 18, 1933 |
| 2,009,136 | Grelck | July 23, 1935 |
| 2,091,629 | Clickner | Aug. 31, 1937 |
| 2,119,614 | Webb et al. | June 7, 1938 |
| 2,326,132 | Fear | Aug. 10, 1943 |

OTHER REFERENCES

"The Making of Processed Cheese," by H. H. Sommer and H. L. Templeton, Research Bulletin 137, June 1939, Agricultural Exp. Station of the Univ. of Wisconsin, Madison, Wisconsin, pages 23, 24.